Sept. 19, 1950

H. M. BAYARD ET AL

COMPLETE PRECORRECTOR FOR SYSTEMS FOR THE TRANSMISSION OF SIGNALS 2,522,737

Filed Feb. 25, 1948

8 Sheets-Sheet 1

INVENTORS
HONORÉ MARCEL BAYARD
R.J.C. ROQUET
By Adams & Bush
ATTORNEYS

Sept. 19, 1950

H. M. BAYARD ET AL

COMPLETE PRECORRECTOR FOR SYSTEMS FOR THE TRANSMISSION OF SIGNALS 2,522,737

Filed Feb. 25, 1948

8 Sheets-Sheet 2

INVENTORS
HONORÉ MARCEL BAYARD
R.J.C. ROQUET
By Adams & Bush
ATTORNEYS

INVENTORS
HONORÉ MARCEL BAYARD
R.J.C. ROQUET
BY Adams & Bush
ATTORNEYS

Sept. 19, 1950 H. M. BAYARD ET AL 2,522,737

COMPLETE PRECORRECTOR FOR SYSTEMS FOR THE TRANSMISSION OF SIGNALS

Filed Feb. 25, 1948 8 Sheets-Sheet 4

INVENTORS
HONORÉ MARCEL BAYARD
R.J.C. ROQUET

By Adams & Bush
ATTORNEYS

INVENTORS
HONORÉ MARCEL BAYARD
R.J.C. ROQUET
By Adams & Bush
ATTORNEYS

Sept. 19, 1950 — H. M. BAYARD ET AL — 2,522,737

COMPLETE PRECORRECTOR FOR SYSTEMS FOR THE TRANSMISSION OF SIGNALS

Filed Feb. 25, 1948 — 8 Sheets-Sheet 6

INVENTORS
HONORÉ MARCEL BAYARD
R.J.C. ROQUET

By Adams & Bush

ATTORNEYS

Sept. 19, 1950

H. M. BAYARD ET AL

COMPLETE PRECORRECTOR FOR SYSTEMS FOR THE TRANSMISSION OF SIGNALS 2,522,737

Filed Feb. 25, 1948

8 Sheets-Sheet 7

INVENTORS
HONORÉ MARCEL BAYARD
R.J.C. ROQUET
By Adams & Bush
ATTORNEYS

Sept. 19, 1950 H. M. BAYARD ET AL 2,522,737

COMPLETE PRECORRECTOR FOR SYSTEMS FOR THE TRANSMISSION OF SIGNALS

Filed Feb. 25, 1948 8 Sheets-Sheet 8

INVENTORS
HONORÉ MARCEL BAYARD
R.J.C. ROQUET
By Adams & Bush
ATTORNEYS

UNITED STATES PATENT OFFICE 2,522,737

COMPLETE PRECORRECTOR FOR SYSTEMS FOR THE TRANSMISSION OF SIGNALS

Honoré Marcel Bayard, Meudon, and Raymond Jacques Charles Roquet, Clamart, France Application February 25, 1948, Serial No. 10,674
In France March 3, 1947

6 Claims. (Cl. 178—69)

We have heretofore described a method for the reduction of distortion distinguished essentially by the fact that it consists in sending along the transmission path a keyed signal modulation which is not the theoretically perfect modulation usually sent and desired at the receiving end, but a modulation which has been intentionally and suitably distorted, known as precorrected, which after distortion applied by the transmission path, takes on at the receiving end a form as near as possible to that of the perfect signal modulation desired.

Such a method takes into consideration only the previous sent signal elements in order to determine the precorrection lag to be imposed at each characteristic moment of the modulation transmitted. We, however, have observed on certain transmission paths where the transition curve shows at its initial point a curvature of a large radius, and when the traffic load or rate of utilisation of such paths is rather high, that the correction of the distortion obtained by this method is incomplete, and that it would be of advantage to take into consideration also signals sent subsequent to the signal under correction.

By way of example and without in any way limiting the scope of the present invention, the description will be made first by considering a bivalent or two-value signal modulation transmitted by double current, the nominal duration of the elementary interval being $\tau$.

With the object of simplifying the description let us suppose that the transmission path is free from external disturbance, that the transition function is increasing, and that the receiver (usually a telegraph relay) is perfect, that is, in particular, that it operates immediately when the current received changes its sign.

Let us consider a reversal of polarity produced by the sender at the input to the path at a moment O (taken as the origin) which terminates at that moment a modulation signal of any kind which had been developing for a given interval of time. Let us first suppose that the reversal of current polarity under consideration is restored by the receiver through the passage of its index or armature from one position to another, at a certain moment $t_x$ obviously subsequent to O and situated therefore in the positive period of time.

The moment O of the reversal of polarity of the current is a characteristic moment of the signal modulation transmitted; the moment $t_x$ is the corresponding characteristic moment of the signal modulation received at the distant end of the line, the time interval $Ot_x$ is the time of propagation relative to the reversal of polarity under consideration.

Theory and practice show that the time position of $t_x$ depends on the signal modulation completed at the moment O and on the transition curve of the transmission path under consideration.

Figure 1:
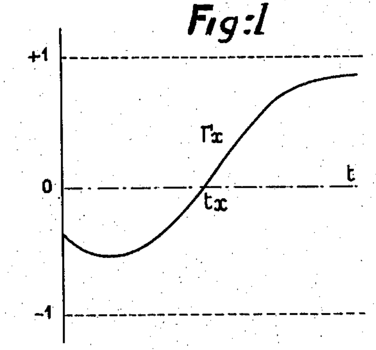

If we represent by the curve $\Gamma x$ (Fig. 1) the current received which is passing through the receiver, the current value being ordinates and the periods of time abscissae, the moment $t_x$ is at the intersection of the curve $\Gamma x$ and the time axis. In Fig. 1 is shown only that part of the curve situated in the region of the positive abscissae.

If a new reversal of polarity has just been transmitted at a moment $t_1$, subsequent to the moment O, two cases may arise:

(a) Either it is subsequent to or at the most contemporaneous with $t_x$, (b) Or it is previous to $t_x$.

In the first case, the effect of the new reversal is to modify the shape of the curve of the current received, in its portion subsequent to reception moment $t_x$ (or at the earliest at that very moment), and this does not modify the moment of operation of the receiver.

Figure 2:
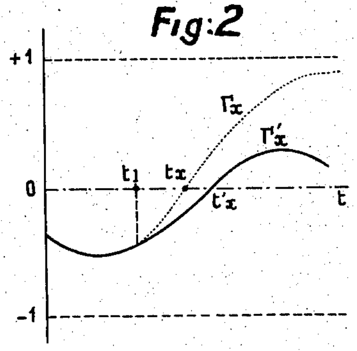

In the second case the curve of the current received at the distant end of the line is modified from the moment $t_1$, previous to $t_x$, as shown in Fig. 2 by way of example. In this figure, $\Gamma x$ is, as in Fig. 1, the curve of the current received without any new reversal of polarity, $\Gamma' x$ is the curve of the current received when a new reversal of polarity is produced at the moment $t_1$, previous to $t_x$. If $\Gamma' x$ cut the time axis and $t'_x$ be the abscissa of the point of intersection, the receiver will operate at that moment. The value of $t'_x$ depends on the same factors as $t_x$ and, besides, of the value of $t_1$.

If a second reversal of polarity were sent before $t'_x$, the curve of the current received would be still more modified, as well as the characteristic moment of the signal modulation received at the distant end of the line, which would assume a value $t''_x$, previous to $t'_x$, and so on.

It will thus be seen that every characteristic moment of the modulation received from a given path depends not only on the changes in polarity (and on the moments at which they are produced) which precede the corresponding characteristic moment of the modulation sent, but also on a certain number of changes of polarity and characteristic instants which follow it. In order to obtain, by precorrection, a received modulation of which each characteristic moment shall be, as far as possible, independent of the others, one must also take into consideration the subsequent signals.

In the preceding paragraphs it has been supposed, in order to simplify the explanation, that curves such as $\Gamma x$ (Fig. 1 or Fig. 2) cut the time axis. However, in cases where a high traffic load or rate of utilisation is sought after, curves such as $\Gamma x$ do not all cut the time axis when the transmitted modulation is perfect. Precorrection based on the preceding signals only, allows one to obtain, over an extensive field of application, the result that all curves such as $\Gamma x$ actually do cut the time axis.

We have observed that whenever the rate of utilisation or traffic load of the transmission path is relatively small, the distortion to be eliminated by the precorrection process is small. The precorrected modulation sent is itself only slightly distorted, and no serious error is made in determining the precorrection by providing that the precorrection lag to be imposed on a certain characteristic moment is independent of the precorrection lag which had been imposed on the characteristic moments which preceded it and of the precorrection lag to be imposed on those which will follow. It is quite a different matter when the rate of utilisation sought after for the transmission path is large, that is, when the distortion to be corrected is considerable, or even when, having exceeded the so-called fidelity limit in reception, this distortion to be overcome is undefined. It is then no longer possible to neglect with impunity the precorrection lag which was imposed on each of the characteristic moments preceding each characteristic moment under consideration, nor that which is to be imposed on each of the subsequent characteristic moments. It is evident, in fact, from an examination of Fig. 1, that according as the last preceding characteristic moment is more or less near, the characteristic moment of the received modulation is more or less displaced and, consequently, the corresponding characteristic moment of the modulation sent must be more or less delayed in order to be precorrected. Likewise, the effect of the precorrection lag imposed on the subsequent characteristic moments is to remove $t_1$ to a distance or to bring it nearer (see Fig. 2) and consequently to affect $t'_x$, which is more or less near $t_x$.

In both cases the precorrection lag must be determined accordingly.

In the case of a perfect transmitted signal modulation, or an almost perfect one, the number of subsequent signals influencing each characteristic moment of the received modulation is limited.

But, in the case of a modulation greatly precorrected, each characteristic moment of the received signal modulation is influenced by all the signals subsequent to it; in fact, each one of them depends on those which immediately follow it, therefore, progressively, each one depends on those which follow. Nevertheless, one may consider it as obvious that the effect on the precorrection of a later signal is smaller according as this later signal is more distant, so that, in practice, one would be content with a certain approximation and only take into account a relatively small number of the signals which follow. It is useful to remember that similar considerations arise in the selection of the number of preceding signals to be considered.

Signals which follow immediately each characteristic moment which one may think it necessary to take into account for precorrection will be termed "subsequent signals." Signals immediately preceding each characteristic moment which one may think it necessary to take into account for precorrection have already been named "preceding signals."

Let us suppose, by way of example, that one considers $m$ preceding signals and $n$ subsequent signals, and that it is still a matter of bivalent or two-value modulation. The assembly of modulations which only differ by signals other than these $m+n$ signals constitute a "group of modulations."

To simplify the explanation we distinguish signals which are either positive or negative by a parameter equal to $+1$ or $-1$, as the case may be.

As concerns the action of the transmitter armature of keying element at a characteristic moment, only two cases can arise:

Where the parameter passes from $-1$ to $+1$
Where the parameter passes from $+1$ to $-1$ For each of these cases, the last preceding signal and the first subsequent signal being fixed, there are $2^{m+n-2}$ groups of different modulations, the groups of the first case being symmetrical each to each with the groups of the other case. From the point of view of distortion, the transmission phenomena are the same for symmetrical modulations. The precorrection lag to be imposed at each characteristic moment O depends on the group of modulations to which the modulation containing it belongs (two identically symmetrical groups obviously demand the same precorrection lag). We will therefore limit ourselves to studying the case where the alternation at the characteristic moment O is an alternation $-1$, $+1$, that is, a passing from negative to positive.

The complete precorrector apparatus with $m$ preceding signals and $n$ subsequent signals can be constructed, according to a particular device of the present invention, with the same general parts as the precorrector apparatus for only preceding signals, that is, a recorder, a selector, a lag-producer and a transmitter with precorrected modualtion, these parts being adapted to the case of the $m+n$ signals recorded, there being added to these general parts of the precorrector with only preceding signals, a device intended to dephase ("stagger") systematically the action of the precorrected transmitter. The dephasing or time displacement ("staggering") thus obtained must be such that the transmitter action corresponding to the characteristic moment defined by its preceding signals and subsequent signals, takes place when, the nth subsequent signal having been recorded, the discrimination of the group of modulations is terminated. This supplementary unit will be termed the "dephaser."

Suppose, by way of example, that it is desired to make complete precorrection with $m=3$ preceding signals and $n=2$ subsequent signals.

Figures 3, 4:
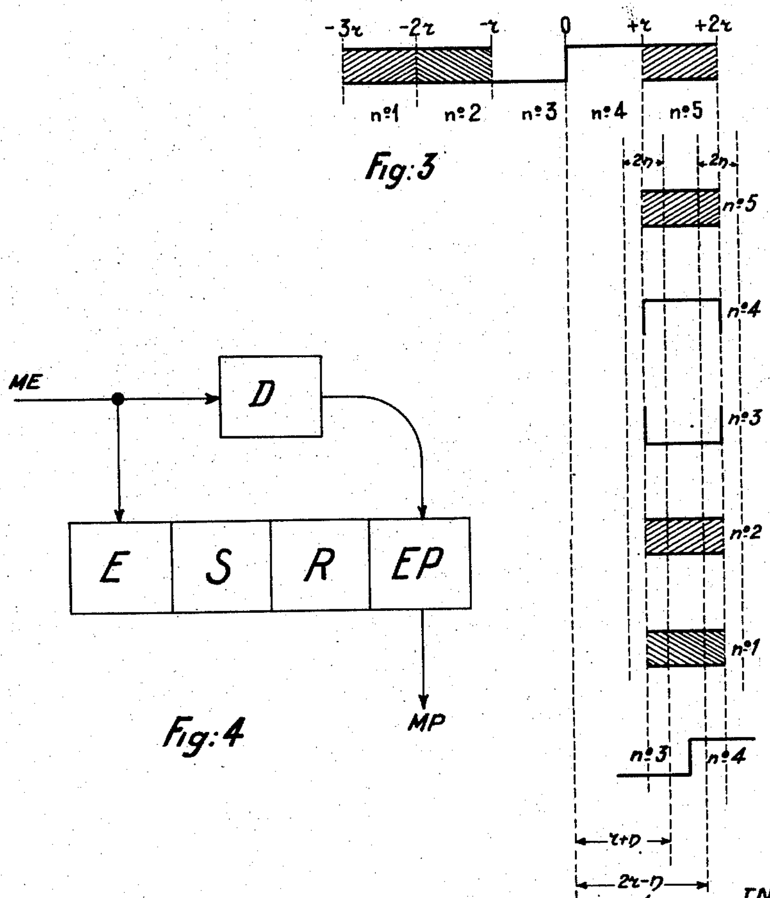

Figure 3 represents, in its general outline, the end of a signal modulation of which the characteristic moment to be precorrected is O, as well as the recording of these five preceding and subsequent signals.

The shaded portions represent signals which may be either positive or negative. $\tau$ is the nominal duration of the elementary interval, that is, the duration of the elementary interval of perfect undistorted modulation.

The recording and the selection are made, in principle, at the start of the last "subsequent signal" (signal No. 5), that is, at the moment $+\tau$ and the lagging circuits are theoretically maintained from that moment $+\tau$ until the moment $+2\tau$ when the recording and discrimination of a new group of modulations commences.

The control action impulse of the precorrected transmitter for sending the alternation separating signals Nos. 3 and 4 must be made during this space of time, preferably at once after the lagging circuits are established, that is, theoretically, at the moment $+\tau$. It will then be necessary to dephase the control impulse of the precorrected transmitter from a time theoretically equal to $(n-1)\tau$ in a forward direction, or else, what comes to the same thing, to control the transmitter with a systematic lag of $(n-1)\tau$ relative to the incoming modulation.

In practice the lagging circuits are not established precisely at the moment $+\tau$, as in the example chosen, on account of the practically unavoidable irregularity of the operating of the parts which prepare these circuits. It is necessary to reserve a guard interval (Fig. 3) of a width of $2\eta$ whose magnitude depends on the apparatus utilised, and to dephase ("stagger") the transmitter drive from a time interval $(n-1)\tau+\eta$ to the minimum. The time separating the moment of the transmitter control impulse and the moment $n\tau-\eta$ being reserved for the precorrection lags, the dephasing ("staggering") must not exceed a certain value compatible with these lags.

Fig. 4 represents in block diagram the assembly of the general parts which constitute the complete precorrector.

In this figure: E represents a recorder, of no matter what model, which conserves during the necessary time the definition of the $(m+n)$ signals terminating the incoming modulation ME, $m$ being the number of the preceding signals and $n$ that of the subsequent signals.

S represents a selector, of no matter what model, which, following the $(m+n)$ recorded signals, discriminates the group of modulations of which the alternation separating the preceding $m$ signals from the subsequent $n$ signals forms a part.

R represents a lag-producing unit, of no matter what type, which inserts into the circuit of the outgoing signal modulation a network or a suitable apparatus corresponding to the group of discriminated modulations, in such a way as to precorrect the characteristic moment separating the $m$ preceding signals from the $n$ subsequent signals.

EP represents a transmitter of no matter what type, delivering to the line the precorrected modulation MP.

D represents a dephaser ("staggerer") which puts into action the control pulses of the precorrected transmitter with a systematic lag, relative to the incoming modulation, equal to a fixed duration greater than $(n-1)\tau+\eta$, this lag being increased by the effect of the lag-producer R.

Any precorrector apparatus for preceding signals—modified in order to take into account the fact that the characteristic moment to be corrected is no longer the end of the last recorded signal, but a characteristic moment previous to it—may constitute a complete precorrector apparatus by adding thereto a dephaser ("staggerer").

Figure 5:
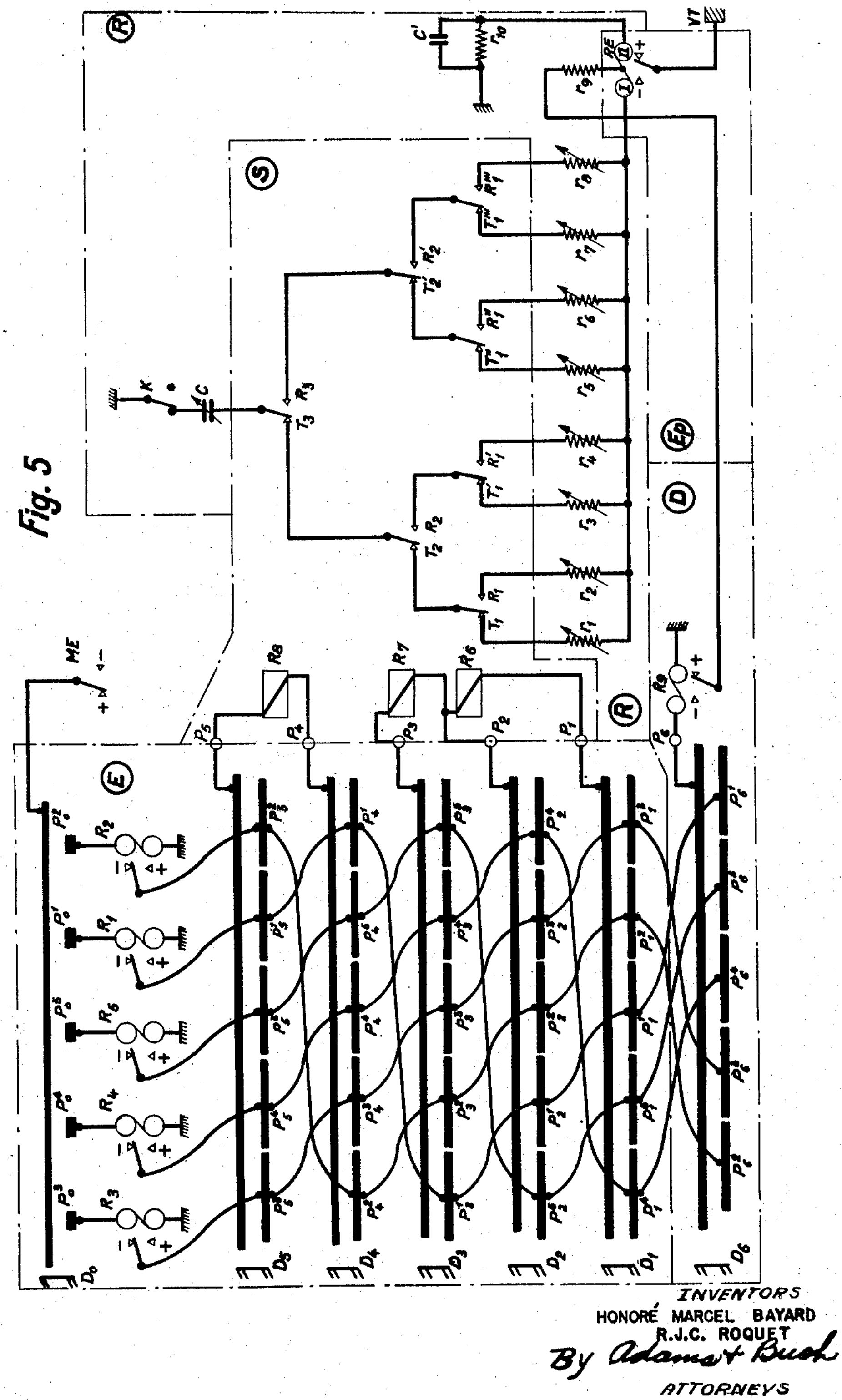

Figure 5 is a circuit diagram, given by way of example, of a complete precorrector apparatus for bivalent or two-value signal modulation with three preceding signals ($m=3$) and with two subsequent signals ($n=2$); the said diagram is not restrictive, and any other type of recorder, selector, lag-producer or transmitter described in the application Ser. No. 593,164, filed May 11, 1945, now abandoned; also applications Ser. No. 75,152, filed Feb. 8, 1949, and Ser. No. 11,278, filed Feb. 26, 1948.

In Figure 5, the part E represents the recorder, the part S represents the selector, the part R the lag-producer, the part EP the precorrected transmitter and the part D the dephaser ("staggerer"). ME is the transmitter actuated by the incoming modulation to be pre-corrected.

The recorder E, which in itself is known, comprises six distributors $D_0$, $D_1$, $D_2$, $D_3$, $D_4$, $D_5$, each with five contact sectors, of which the brushes make one complete revolution during the nominal duration of the five preceding and subsequent signals to be recorded ($5\tau$), and five neutral polarised telegraph relays $R_1$, $R_2$, $R_3$, $R_4$, $R_5$, that is, polarized relays so arranged as to operate in one direction or in the opposite direction from a normal neutral position, according to the direction of the current in the controlling circuit. The distributors are mechanically coupled with the apparatus generating the incoming modulation, or they are subjected to the time basis of this apparatus, or they are maintained in synchronism with the apparatus producing the incoming signal modulation by means of a standard correcting device. The distributor $D_0$ comprises five short contact studs, regularly spaced, the brush engaging period of which is sufficient for the relays $R_1$ to $R_5$ to be actuated. The relays $R_1$ to $R_5$ are neutral polarised telegraph relays of usual type. They are successively actuated when the brush of distributor $D_0$ traverses its successive contacts and each relay in turn during the period $5\tau$ retains the definition of one signal in five of the incoming modulation.

The contact sectors of the distributors $D_1$ to $D_5$ are each one-fifth of the circumference in length. The distributor $D_5$ is so placed that its brush acts on the contact stud $p_5^5$ when, the brush of the distributor $D_0$ having just acted on the contact stud $p_0^5$, the relay $R_5$ has had time to operate. The distributors $D_1$ to $D_4$ are so placed that their brushes engage simultaneously the contact sectors $p_1^1$, $p_2^2$, $p_3^3$, $p_4^4$ respectively when the brush of the distributor $D_5$ engages the contact sector $p_5^5$.

Under these conditions, the brushes of $D_1$ to $D_5$ deliver at each moment:

$D_1$ the modulation which terminates $2\tau$ before the characteristic moment to be corrected, which we will call "antepenultimate modulation."

$D_2$ the modulation which terminates $\tau$ before the characteristic moment to be precorrected, which we will call "penultimate modulation."

$D_3$ the "ultimate" modulation, which terminates at the characteristic moment to be precorrected.

$D_4$ the "first" modulation, which terminates at the moment $\tau$ after the characteristic moment to be precorrected.

$D_5$ the "second" modulation, which terminates $2\tau$ after the characteristic moment to be precorrected.

The selector S, of known type, comprises three nonpolarised marking or selecting relays $R_6$, $R_7$, $R_8$ of which the first has four armatures, the second two armatures, the third one armature. The relay $R_7$ may be replaced by two relays with one armature, and $R_6$ by two relays with two armatures or four relays with one armature. The non-polarised relays, of a type used in telephony, may be replaced by neutral polarised telegraphic relays, of usual type, by excitation behind rectifier cells, with a compensating circuit or appropriate device according to some standard method. Such neutral polarized telegraph relays are polarized relays so arranged as to operate in one direction or in the opposite direction from a normal neutral position, according to the direction of the current in the controlling circuit.

The connections of these marking or selecting relays are established in conformity with the arrangement in Fig. 5.

The relay $R_8$ is energized when the two signals following the characteristic instant to be corrected are of differing polarities, and at rest in the contrary case.

The relay $R_7$ is energized when the two preceding ultimate and penultimate signals are of differing polarities, and at rest in the contrary case.

The relay $R_6$ is energized when the two preceding penultimate and antepenultimate signals are of differing polarities, and at rest in the contrary case.

By their positions, the armatures of the relays $R_6$, $R_7$, $R_8$ select the incident group of signal modulations of which the characteristic moment to be precorrected is at the end of the ultimate preceding signal and at the start of the first subsequent signal.

The lag-producer R, of type known in itself, comprises: a condenser C, an interrupter K, nine resistances $r_1$ to $r_9$, a condenser C', shunted by a resistance $r_{10}$.

In the Fig. 5, resistances $r_1$ to $r_8$ are connected together, for convenience, to one terminal of the winding 1 of the relay transmitter RE. In practice, in order to obtain a convenient graduation of lags, one makes winding 1 of several sections connected in series, and one connects the resistances $r_1$ to $r_8$ by groups or separately to common points and at the free end of these sections.

The condenser C, the resistance $r_9$, the condenser C' shunted by the resistance $r_{10}$, and one of the resistances $r_1$ to $r_8$ put in circuit by the selector, constitute a lag circuit of the transmitter relay RE, such as those described in the application Ser. No. 595,234, filed May 22, 1945, now Patent No. 2,507,191, by the same inventors for: Antidistorting and Lagging Device for the Transmission of Signals.

The transmitter relay RE is a neutral polarised telegraph relay of usual type, differential connected, or any other equivalent arrangement coming within the scope of the application Ser. No. 595,234 above mentioned.

The switch K, when open, allows of the elimination of the precorrection lag, and consequently, of transmitting a modulation not precorrected. By throwing this switch it is possible to compare the reception of a precorrected signal modulation with that of a non-precorrected modulation.

The dephaser ("staggerer") D comprises: a distributor $D_6$ and a relay separator $R_9$. The distributor $D_6$ is identical to the distributors $D_1$ to $D_5$, and its brush turns with the same speed, as $D_1$ to $D_5$ but it is so placed that this brush first engages the contact stud $p_6^4$ when the brush of $D_5$ has left its contact stud $p_5^4$ for a period of time equal to a determined guard interval $\eta$ diminished by the time of operation of the relay $R_9$. The relay $R_9$ is a neutral polarised telegraphic relay, of usual type, that is, a polarised relay so arranged that it operates in one direction or in the opposite direction from a normal neutral position, according to the direction of the current in the controlling circuit. Its role is to separate electrically the selection circuits (relays $R_6$ to $R_8$) from the control circuit of the transmitter relay RE, which control circuit, without this precaution, might be disturbed. It is possible to dispense with the separator relay $R_9$ by suitably determining the resistances which limit the magnitude of the current within the different circuits.

The separator relay $R_9$ may be replaced by two relays operating as reversers of the source of current, by means of a familiar arrangement, which offers the advantage of allowing the relay transmitter RE to be controlled by an electromotive force absolutely equal in both directions.

The dephaser ("staggerer") reproduces a given modulation with a certain amount of lag. It is the same thing for the different stages of a recorder. Any type of recorder, after being adapted in a suitable and obvious manner, may be used as dephasers.

Figure 6:
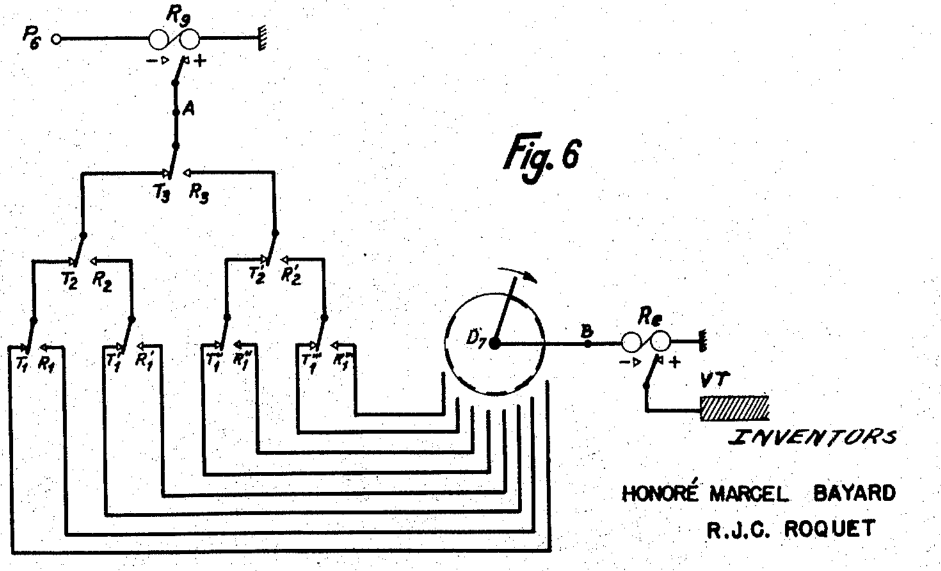

Figure 6 represents, as a modification by way of another example, a selector-retarder assembly with distributor and precorrected-transmitter, connected to the separator relay $R_9$ of the dephaser of Fig. 5. In Fig. 6, for simplicity, there are not shown the relays $R_6$ to $R_8$ of Fig. 5, in their complete state, but only their armatures and their stops. The relay transmitter $R_e$ is a neutral polarised telegraphic relay of any suitable type.

This arrangement of Fig. 6 comprises an output distributor $D_7$ which makes one complete revolution during the nominal duration $\tau$ of the elementary interval of the incoming signal modulation. The eight contact studs of this distributor, $D_7$ the position of which is adjustable, are distributed over one or more contact banks. If the points A and B (Fig. 6) were connected directly by a conductor the relay $R_e$ would be controlled without any lag by the separating relay $R_9$. But, since between these points A and B there are inserted the selection circuit and the distributor $D_7$, the transmitting relay $R_e$ is only actuated when the brush of the distributor $D_7$ passes over the contact stud connected into circuit by the selector, which brings about the precorrection lag.

Figure 7:
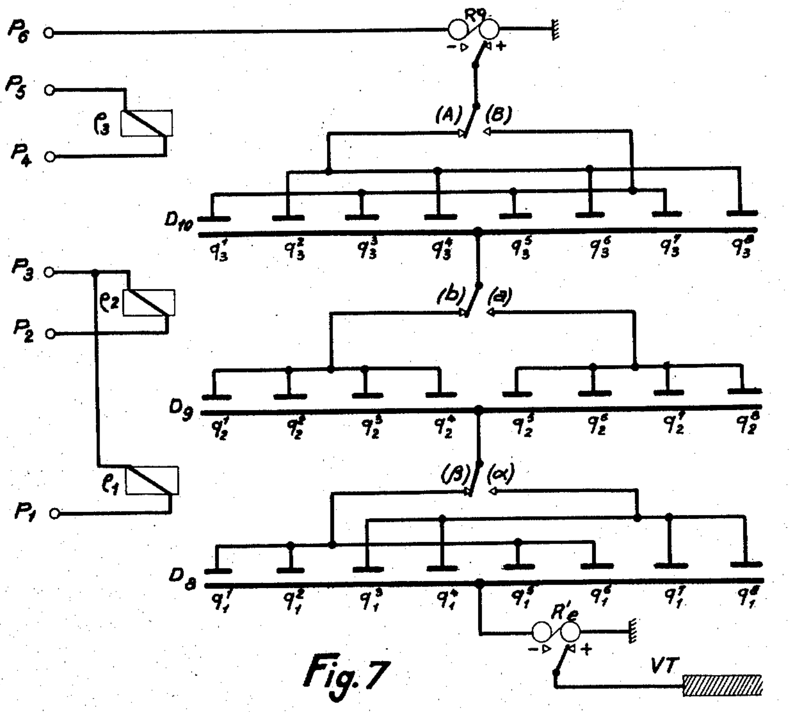
Figure 8:
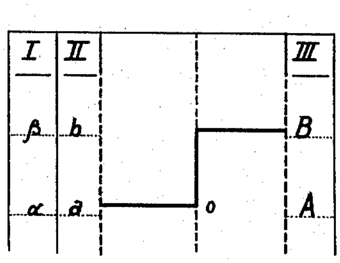

Figure 7 represents another modification of the selector-lag-producer assembly based on the following observations:

If one represents symbolically, as in Fig. 8, all the possible groups of signal modulations, limited to three preceding signals and two subsequent signals, in the case where the transmitter makes the potential pass from negative to positive at the moment zero, it will be seen that they may be classified in three series:

*3rd series.*—The second subsequent signal is negative (case A) or positive (case B);

*2nd series.*—The penultimate preceding signal is negative (case $a$) or positive (case $b$);

*1st series.*—The antepenultimate preceding signal is negative (case $\alpha$) or positive (case $\beta$).

Every group of signal modulations can be designated by the three cases to which it belongs and, inversely, the designation of the three cases (one in each series) is sufficient to define a group of signal modulations in an unambiguous manner.

Figure 9:
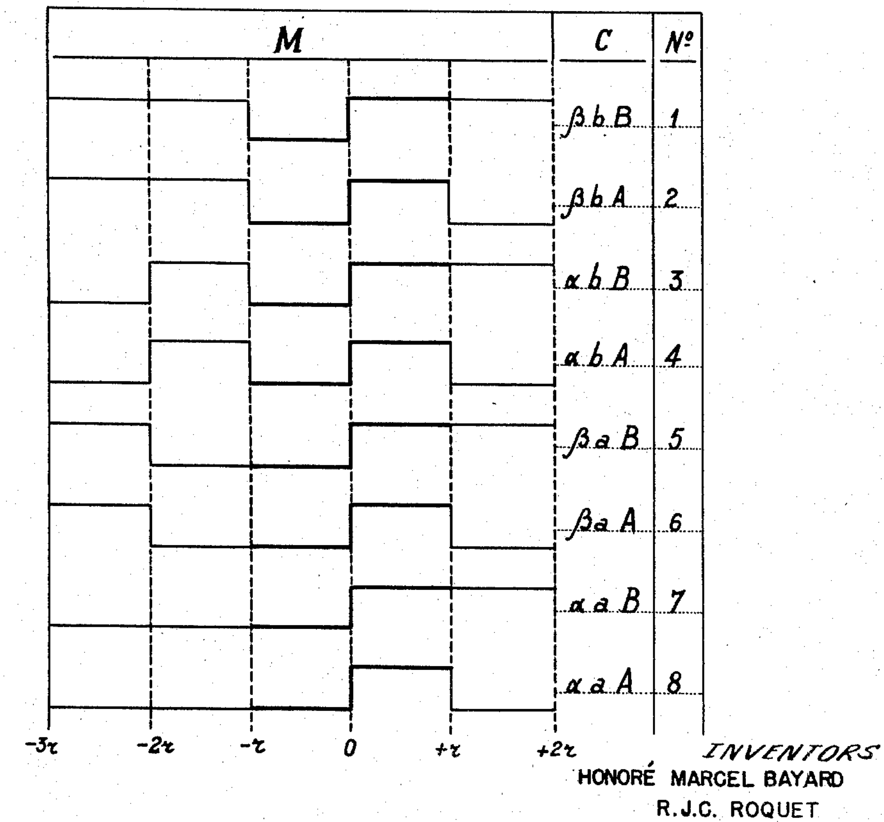

Figure 9 gives, in the form of a table, the different groups of signal modulations possible, shown in the column M, with the corresponding coordinates, indicated in column C. If the number of preceding and subsequent signals are, say, $m$ and $n$, respectively, the number of series to be considered will be $2^{m+n-2}$.

In Figure 7, $R_9$ is the separating relay of Figure 5, $Re'$ is the output transmitter relay, $\rho 1$, $\rho 2$, $\rho 3$ are the selector relays, non-polarised, each with one armature. The terminals $P_1$ to $P_6$ refer to Figure 5, the arrangement of Figure 7 replacing the portion of Figure 5 which is to the right of the said terminals $P_1$ to $P_6$. $D_8$, $D_9$ and $D_{10}$ are synchronised distributors having all the same characteristics as the distributor $D_7$ of Figure 6, and likewise revolving at the rate of one complete revolution during the time $\tau$. The eight contact studs of each one of these distributors are separately adjustable as regards position, but the corresponding contact studs of the three distributors $D_8$, $D_9$, $D_{10}$ are engaged simultaneously. The contact studs are marked $q_1^1$ to $q_1^8$, for distributor $D_8$; $q_2^1$ to $q_2^8$ for distributor $D_9$; $q_3^1$ to $q_3^8$ for distributor $D_{10}$. On Figure 7 the distributors are developed according to a manner of representation; this representation does not in any way limit the actual position of the contact studs; in particular, the order in which they are actually passed over may be modified.

The relay $\rho 3$ is energized when a reversal of polarity is produced at the moment $+\tau$, that is, for the groups of modulations of the third series case A, and at rest when no inversion is produced at the moment $+\tau$, that is, for the groups of modulations of the third series, case B. The contact studs $q_3^2$, $q_3^4$, $q_3^6$, $q_3^8$ bearing the same order numbers as the groups of case A are connected to the actuated stop of relay $\rho 3$ and the contact studs $q_3^1$, $q_3^3$, $q_3^5$, $q_3^7$ to the rest stop of the same relay.

The relay $\rho 2$ is energized when a current reversal is produced at the moment $-\tau$, that is, for the groups of modulations of the second series case $b$, and at rest in the contrary case, that is, for the groups of the second series case $a$. The contact studs $q_2^1$, $q_2^2$, $q_2^3$, $q_2^4$ which bear the same numbers as the groups of case $b$, are connected to the actuated stop, and the contact studs $q_2^5$, $q_2^6$, $q_2^7$, $q_2^8$ to the rest stop of the same relay.

The relay $\rho 1$ is energized when the antepenultimate signal is of a different polarity from the ultimate one, that is, for the groups of signal modulations of the first series case $\beta$, and at rest in the contrary case, that is, for the groups of the first series case $\alpha$. The contact studs $q_1^1$, $q_1^2$, $q_1^5$, $q_1^6$ bearing the same numbers as the groups of case $\beta$ are connected to the actuated position contact of relay $\rho 1$ and the contact studs $q_1^3$, $q_1^4$, $q_1^7$, $q_1^8$ to the rest stops of the same relay.

The connection between the armature of the separating relay $R_9$ and the output transmitting relay $R'e$ is only completed when the three brushes of the distributors $D_8$, $D_9$ and $D_{10}$ pass simultaneously over the three contact studs which have been selected by the selector relays $\rho 1$, $\rho 2$, $\rho 3$, according to the specific coordinates of the incident group of signal modulations. For example, when the group of modulations No. 2 presents itself, of which the coordinates are $\beta b$A, the connection is established at the moment when the three brushes of the distributors simultaneously engage the contact studs $q_3^2$, $q_2^2$ and $q_1^2$.

We have observed that the precorrection lag to be imposed on the transmitting relay, for a given group of signal modulations is approximately equal to the algebraic sum of the lags specific to each of the coordinates of this group of modulations. For example, the precorrection lag corresponding to group 5, of which the coordinates are $\beta a$B is very nearly equal to the sum of the three specific lags of each of the cases $\beta$, $a$ and B, each of these specific lags being the same, whatever may be the series to which the group of modulations belongs.

Although the additivity of the lags may not be strictly accurate, it is approximate closely enough to afford good practical results.

One may apply this property to all the preceding or subsequent signals, but one may also apply it for one part only of the signals under consideration, for example for those which are the most remote from the characteristic moment. These signals have, in fact, a weaker action than the others.

Figure 10:
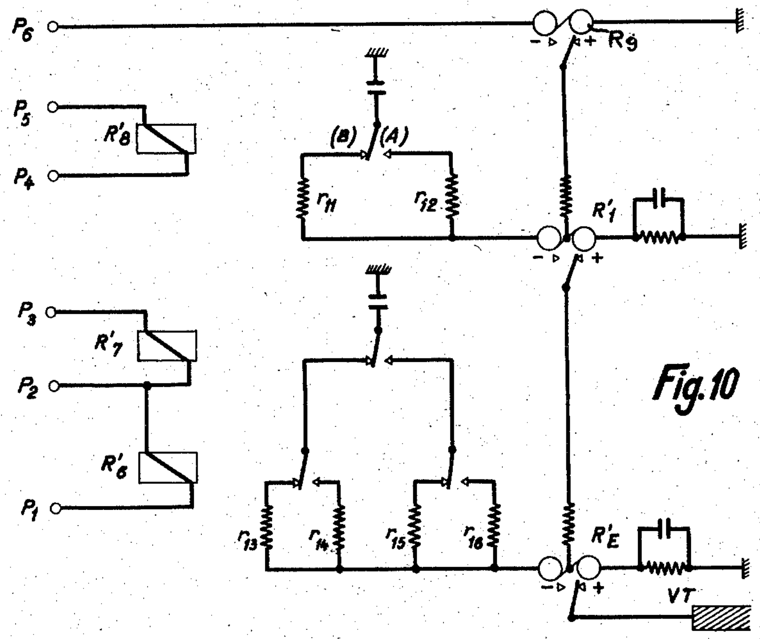

Figure 10 represents an example of the application of this property to the second subsequent signal, that is, for the third series of the groups of signal modulations. The terminals $P_1$ to $P_6$ refer to Figure 5, the arrangement of Figure 10 replacing the whole of the portion of Figure 5 included on the right side of these terminals. $R_9$ is the separating relay, $R'_E$ the output transmitting relay, and $R'_1$ an intermediary relay.

$R'_6$, $R'_7$, $R'_8$ are selector relays identical to the relays $R_6$, $R_7$, $R_8$ of Figure 5, but with, respectively, two, one, and one armatures.

When a group of modulations of case A presents itself, the relay $R'_8$ becomes energized and introduces a resistance $r_{11}$ into the lagging circuit of the relay $R'_1$. When it becomes de-energized (case B), it introduces another resistance $r_{12}$. The intermediate relay $R'_1$ controlled by the relay $R_9$ operates with a lag dependent on the resistance introduced ($r_{11}$ or $r_{12}$), therefore of the case A or B.

The relays $R'_6$ and $R'_7$ introduce one of the resistances $r_{13}$ to $r_{16}$ into the lagging circuits of the transmitter relay $RE'$ actuated by intermediate relay $R'_1$. This assembly ($R'_6$, $R'_7$ and $R_E'$) operates, during this operation, as an ordinary precorrector with preceding signals. The intermediate relay $R'_1$ being already time lagged by the play of relay $R'_8$, the lag of the relay $R_E'$ is consequently so much the more increased.

Figure 11:
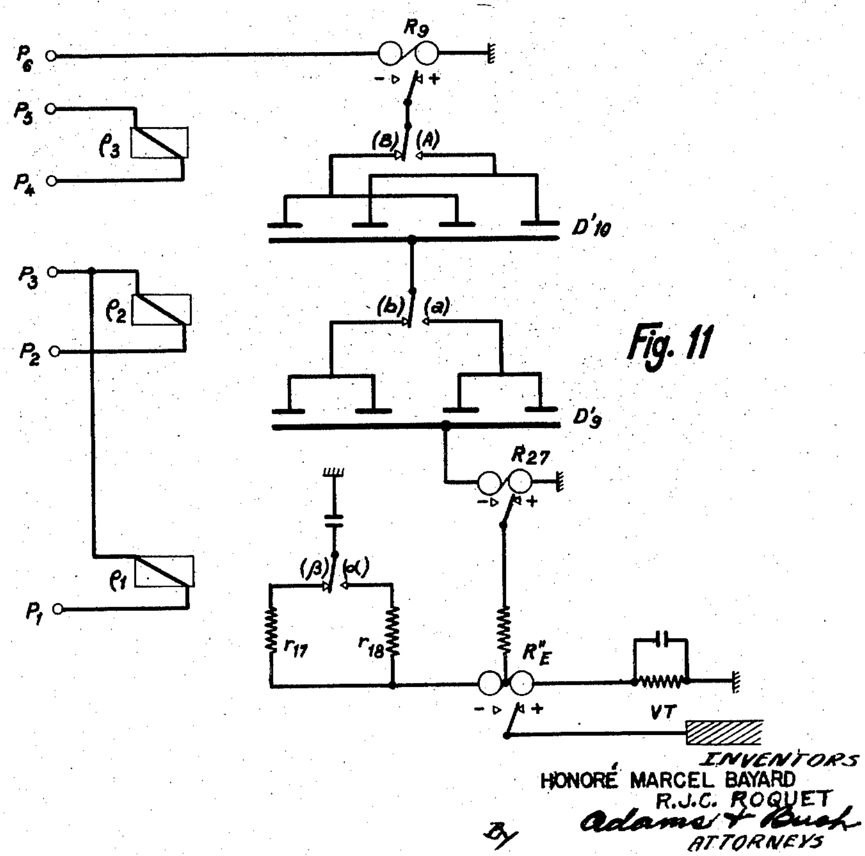

Figure 11 represents another modification for putting the invention into practice, in which the property of additivity is applied for the first series of the groups of modulations (that is, for the preceding antepenultimate signal).

The terminals $P_1$ to $P_6$ refer to Figure 5, and Figure 11 represents an assembly which replaces the whole of that part of Figure 5 placed to the right of these terminals. $R_9$ is the separating relay, $R_E''$ the transmitting relay, $\rho 1$, $\rho 2$, $\rho 3$ are the relays with the same designation as in Figure 7. $D'_9$ and $D'_{10}$ are rotary distributors of identical construction and identical roles to those of Figure 7, except that they each have four contact sectors instead of eight, $r_{17}$ and $r_{18}$ are adjustable resistances. The relay $R_{27}$ is an auxiliary ordinary telegraph relay (polarised and neuter) that is, a polarised relay so arranged that it operates in one direction or in the opposite direction from a normal neutral position, according to the direction of the current in the controlling circuit.

When a group of signal modulations appears belonging to cases A, B, *a*, *b*, the assembly of the relays $\rho 2$ and $\rho 3$ and of the distributors $D'_9$ and $D'_{10}$ establishes the connection between the armature of the relay $R_9$ and the auxiliary relay $R_{27}$ at a certain moment corresponding specifically to this group of modulations. The relay $R_{27}$ at this moment energizes the transmitting relay $R''_E$ with a current in the same direction as that of the separating relay $R_9$, and maintains this energizing current until its armature changes position. If the transmitting relay $R_E''$, instead of being connected as a lagging relay were connected in an ordinary manner, it would operate with a precorrection lag determined by the distributors $D'_9$ and $D'_{10}$, neglecting the operating time of the auxiliary relay $R_{27}$, only taking into account, therefore, the signals of the second and third series of the groups of modulations. But, as $R_E''$ is arranged as a lagging relay with a lag determined by the play of the relay $\rho 1$, the armature of which introduces one or the other of the two resistances $r_{17}$ and $r_{18}$, according as the group of signal modulations belongs to case $\alpha$ or to case $\beta$, the precorrection lag imposed by the play of the relays $\rho 2$ and $\rho 3$ adds itself on to that of the relay $\rho 1$, which effects the addition required.

We have observed that as soon as the number $(m+n)$ of the preceding and subsequent signals exceeds a few units, the number of the groups of signal modulations involved becomes rapidly increased, which may render excessively large the number of parts required to produce the precorrection lag of the transmitter relay. The property, pointed out above, of the additivity of the lags, is an effective means for reducing the number of parts.

In order to simplify the explanation by limitation, to the case of an increasing transition curve, and to the groups of signal modulations represented in Figure 9, and referring to Figure 2, we have observed that certain subsequent signals were likely to delay the arrival of the characteristic moment of the signal received, while certain preceding signals as were likely to advance it in relation to the group of signal modulations No. 7, that is, $\alpha a$B. For example, the characteristic moment of the modulation received for the group of modulations No. 5 ($\beta a$B) is previous to that of group No. 7, while that corresponding to group No. 8 is subsequent to it.

One may therefore expect that the combination of opposing effects due to the preceding signals and subsequent signals would lead to lags which are equal, or nearly so, for two or more groups of modulations. Experience and theory confirm this expectation. This observation supplies another means for diminishing the number of the lag-producing elements of the precorrector. It consists in utilising lag-producing elements common to two or more groups of modulations.

The number of lag-producing elements as so reduced depends on the degree of approximation desired, and it is evident that it must not be reduced to the point of losing the advantage of the consideration of a higher number of preceding or subsequent signals. Let us suppose, for example, that the group of modulations No. 4 ($\alpha b$A) and No. 5 ($\beta a$B) of the table of Figure 9 corresponds to precorrection lags substantially equal. If the precorrector is the one the arrangement of which is represented in Figure 5, the resistances $r_1$ and $r_7$ may be replaced by a single resistance connected at the same time to the stops $T_1$ and $T_1''$, and so on.

This observation allows of making a selector-lag-producer assembly comprising a number of elements determined a priori and of which one only utilises, in common or not with several groups of modulation, those indicated by theory or experimentation. The selector-lag-producer represented by Figure 6 would comprise, for example, a score of contacts, distributed regularly or not, but fixed, among which one would select each one of those which are to be connected to the stops $T_1$, $R_1$ . . . $T_1'''$, $R_1'''$, it being possible to connect two or more stops to one and the same contact stud.

The preceding examples refer to the case of bivalent or two-value modulation. The present invention is likewise applicable to transmission systems with trivalent or three-value modulation, that is, in which each signal is defined by the one of the three values which may be taken by the corresponding parameter, for example, $-1$, $0$, and $+1$. The precorrector must then be constituted according to the application Ser. No. 595,234 already mentioned.

In order to simplify the explanation for trivalent signals, and without in any way restricting the present invention for these trivalent signals, we will take into consideration three preceding signals and two subsequent signals.

Figure 12:
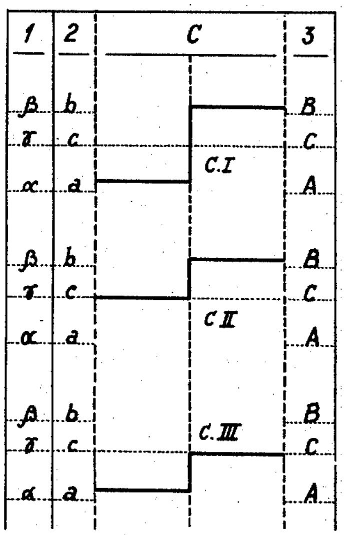

Figure 12 represents the different groups of modulations possible in this case, or a total of eighty-one (81) different groups (not including the inverse groups defined by the sets of opposed parameters). In general, for trivalent signals, with $m$ preceding signals and $n$ subsequent signals, the number of different groups of modulations is 3 $(m+n+1)$ (not including the inverse ones).

Figure 13:
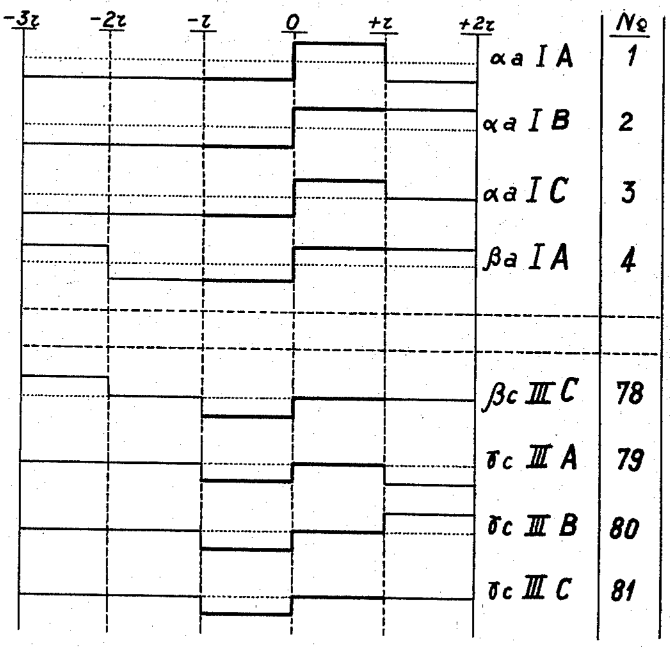

The first four and the last four of these groups are represented in Figure 13.

The number of groups of modulations being large, the means for reducing the number of lag-producing elements are here particularly important. Figure 14 (including Figure 14—*a* and Figure 14—*b*) represents, by way of example, a precorrection system for trivalent modulation, with three preceding signals and two subsequent signals, including only the parts or assemblies of parts which are known, and applying the additivity of the lags for the third series of the groups of signal modulations, that is, for the last subsequent signal, as well as for the first series of the groups of modulations, that is, for the preceding antepenultimate signal.

The incoming modulation is broken up into two bivalent modulations, according to the method shown in the application Ser. No. 595,234 of the same inventors. The transmitting armatures K and K' (Figure 14—*a*) produce, respectively, these two bivalent modulations, which we shall call K and K' modulations respectively; for a plus one signal of the trivalent modulation, the corresponding signals of the bivalent modulations K and K' are both positive; for a minus one signal of the trivalent modulation, they are both negative; finally, for an O signal of the trivalent modulation, the corresponding signal of K is positive and that of K' is negative.

Figure 14A:
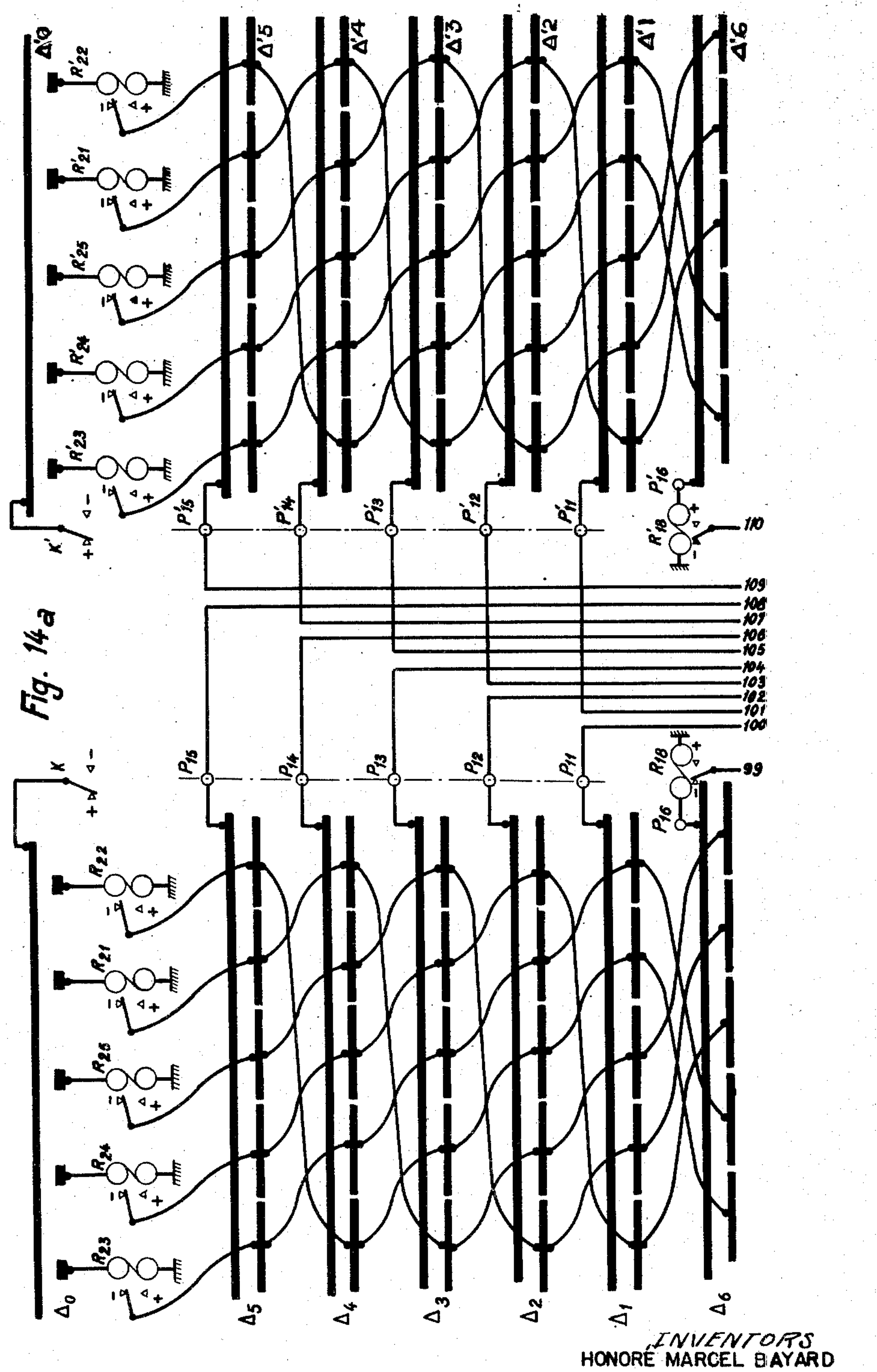
Figure 14B:
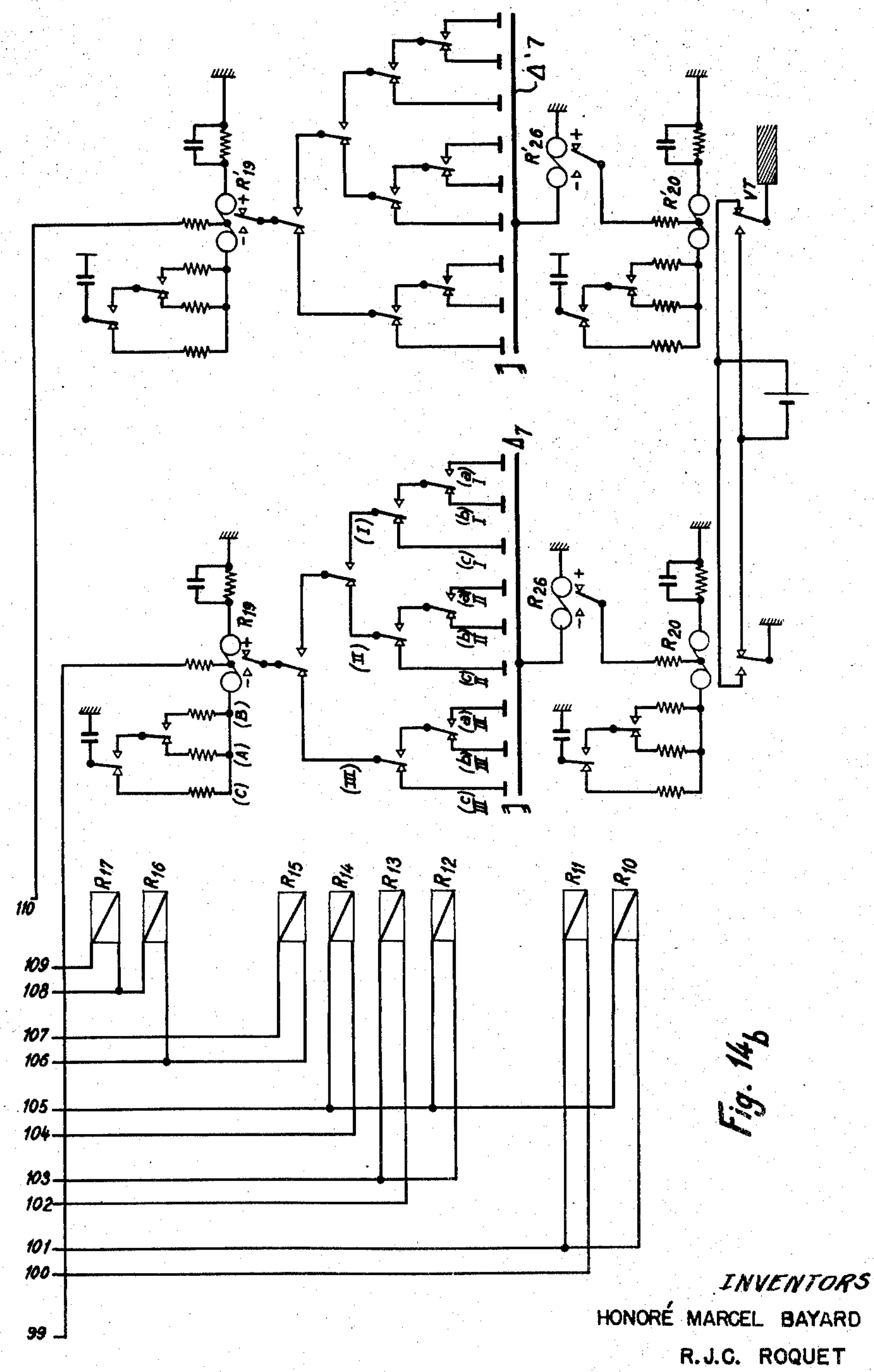

The recorder of each one of the bivalent modulations K and K' of Figs. 14*a*—14*b* is of the same type as that represented by Figure 5. It is formed by the distributors $\Delta 0$ to $\Delta 5$, and the relays $R_{21}$ to $R_{25}$ for the modulation K; by the distributors $\Delta'0$ to $\Delta'5$ and the relays $R'_{21}$ to $R'_{25}$ for the modulation K'. The dephaser of each of these two modulations is likewise of the same type as that of the precorrector of Figure 5. It is formed by the distributor $\Delta 6$ and the separating relay $R_{18}$ for the modulation K and by the distributor $\Delta'6$ and the separating relay $R'_{18}$ for the modulation K'. The dephasing is the same as if it were a matter of a bivalent modulation. The recorders and the dephasers for the two modulations K and K' are precisely identical and in phase.

Figure 15:
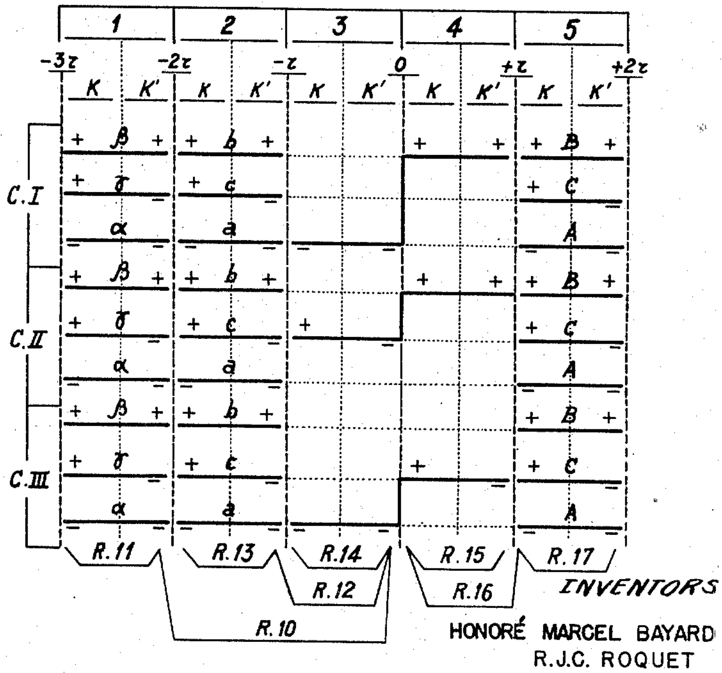

The selector relays $R_{10}$ to $R_{17}$ Fig. 14—*b* are non-polarised relays. Figure 15 represents symbolically the groups of modulations and their breaking up according to transmitting armatures K and K', as well as the connections of the relays $R_{10}$ to $R_{17}$, which allows of following their operations.

The table given below indicates for which groups of modulations each of the relays comes into energized position and into rest position, as well as the groups of modulations which are selected by the relay assemblies.

*Table W*

| Relay | Operation | Rest | Groups selected |
|---|---|---|---|
| $R_{10}$ | $\beta$ | $\alpha\gamma$ | $\alpha\beta\gamma$ |
| $R_{11}$ | $\gamma$ | $\alpha\beta$ | |
| $R_{12}$ | *b* | *a, c* | *a, b, c.* |
| $R_{13}$ | *c* | *a, b* | |
| $R_{14}$ | II | I, III | I, II, III. |
| $R_{15}$ | III | I, II | |
| $R_{16}$ | A | BC | A, B, C. |
| $R_{17}$ | C | BA | |

The number of armatures which each selector relay $R_{10}$ to $R_{17}$ must have is indicated on Figure 14—B. One may, of course, replace each relay by several relays each having a smaller number of armatures.

The relays $R_{19}$ and $R'_{19}$ are intermediary relays: these are neutral polarised telegraphic relays of usual type that is, polarised relays so arranged as to operate in one direction or in the opposite direction from a normal neutral position, according to the direction of the current in the controlling circuit. They operate as time-lagged relays, their lag circuits, identical, being controlled by the play of the relays $R_{16}$ and $R_{17}$. Their lag constitutes the precorrection lag assigned for the third series of groups of modulations.

The distributors $\Delta 7$ and $\Delta'7$ (Fig. 14*b*) have the same characteristics as the distributor $D_7$ of Figure 6; Figure 14*b* represents them developed. The orientation of their contact sectors is identical. It will be recognised that the selector-lag-producing assembly to which belong the distributor $\Delta 7$ and the relay $R_{26}$ is the same as the one represented in Figure 6; the same thing holds good for the assembly to which belong the distributor $\Delta'7$ and the relay $R'_{26}$. The relays $R_{20}$ and $R'_{20}$ are transmitter relays (neutral polarised telegraph relays) which carry out the synthesis of the precorrected trivalent modulation by combining the two bivalent modulations. They operate as time-lagged relays, their lag circuits, identical, being controlled by the play of the relays $R_{10}$ and $R_{11}$. Their lag is the additive precorrection lag assigned for the first series of groups of modulations (cases $\alpha\beta\gamma$) and adds itself on to that of the relays $R_{19}$ and $R'_{19}$ and to that of the selector-lag-producer assembly to which belong $\Delta 7$ and $\Delta'7$.

It will be apparent to those skilled in the art that our invention is susceptible of modifications to adapt the same to particular applications, and all such modifications which are within the scope of the appended claims, we consider to be comprehended within the spirit of our invention.

What we claim is:

1. In a device for the pre-correction of transmitted telegraph signals, a telegraph transmitter, a recorder connected to said transmitter and adapted to record the polarity of the $m$ signals which precede and of the $n$ signals which follow the instant of the change of signal polarity to be pre-corrected, said recorder comprising $m+n$ rotary distributors each comprising $m+n$ contact sectors which are relatively staggered, a selector comprising a chain of two-position marking relays whose windings are connected between the brushes of said successive distributors of the recorder, each said marking relay comprising twice as many armatures and pairs of contacts as the preceding said marking relay, the armatures of each said marking relay being connected to the contacts of the preceding said marking relay, a re-transmitting relay having a center-tapped winding and a controlled armature, a retarding unit constituted of at least one condenser and a plurality of resistances connected at one of its terminals to the contacts of the last said marking relay and at the other of its terminals to the terminals of the windings of said re-transmitting relay, a pair of direct current sources of opposite polarity, said re-transmitting relay having its armature connected to the line on which the pre-corrected signals are to be sent and whose contacts are connected to said two sources of opposite polarities respectively, an auxiliary relay, a staggering device comprising a staggering rotary distributor whose contact sectors are connected to the contact sectors of said rotary distributors of said recorder and selector and whose brush is connected through the winding of said auxiliary relay to the mid-point of the winding of said re-transmitting relay, said brush of said last mentioned staggering distributor being set in such manner that said re-transmitting relay will be energized with a delay relative to the transmission of the polarity change to be pre-corrected which is slightly greater than $n-1$ times the duration of one non-distorted signal.

2. In a device for the pre-correction of transmitted telegraph signals, a telegraph transmitter, a recorder selector connected to said transmitter and comprising a chain of recording selecting relays recording the polarity of $m$ signals which precede and of $n$ signals which follow the instant of the change of signal polarity to be pre-corrected, each said recording selecting relay comprising twice as many armatures and pairs of contacts as the preceding said recording selecting relay, the armatures of each said recording selecting relay being connected to the contacts of the preceding said recording selecting relay, a separating relay, control means for controlling said separating relay with a delay relative to the transmission of said change of polarity which is slightly greater than the duration of $n-1$ undistorted signals, two separating direct current sources of opposite polarities, the contacts of said separating relay being connected to said two separating sources of opposite polarities, the armature of the first said recording selecting relay being connected to the armature of said separating relay, a rotary distributor making one turn during the duration of one undistorted signal and having its fixed contact sectors connected respectively to the contacts of the last said recording selecting relay, two transmitting sources of opposite polarities, and a re-transmitting relay whose contacts are connected to said two transmitting sources of opposite polarities, and whose armature is connected to the line on which the pre-corrected signals are to be transmitted, the winding of said re-transmitting relay being connected to the brush of said rotary distributor.

3. In a device for the pre-correction of signals, a telegraph transmitter, a recorder selector connected to said transmitter and comprising a chain of marking relays each having one armature and respectively recording the polarity of the $m$ signals which precede and of the $n$ signals which follow the instant of the change of polarity to be pre-corrected, two separating sources of opposite direct current polarity, a separating relay, control means for said separating relay, connected in such manner as to actuate said separating relay from the input signal with a delay with relation to the transmission of the change of polarity to be pre-corrected, which is slightly greater than the duration of $n-1$ undistorted signals, the contacts of said separating relay being respectively connected to said two separating sources of opposite polarities and the armature of said separating relay being connected to the armature of the first said marking relay, a chain of rotary distributors whose number is equal to the number of said marking relays, each having a plurality of contact sectors, and whose brushes turn in synchronism once during the duration of one undistorted signal, two transmitting direct current sources of opposite polarities, a re-transmitting relay whose winding is connected to the brush of the last said distributor and whose two contacts are connected to said two transmitting sources of opposite polarities and whose armature is connected to said transmission line, each of the said rotary distributors having its contact sectors inter-connected in two equal groups connected to the contacts of the corresponding preceding marking relay, and its brush connected to the armature of the next said marking relay, the contact sectors of each of the said rotary distributors being connected in such manner that to each group of contact sectors engaged simultaneously by the brushes there corresponds a different combination of the positions of the armatures of said marking relays.

4. In a device for the pre-correction of telegraph signals, a telegraph transmitter, a recorder connected to said transmitter and comprising a chain of marking relays recording the polarity of $m$ signals which precede and of $n$ signals which follow the instant of the changing of polarity to be pre-corrected, two separating direct current sources of opposite polarities, a separating relay, control means for said separating relay connected in such manner as to actuate said separating relay from the input signal with a delay with relation to the transmission of the change of polarity to be pre-corrected which is slightly greater than the duration of $n-1$ undistorted signals, the contacts of said separating relay being connected to said two separating sources of opposite polarities, a plurality of control relays each having a center tapped winding, individual pairs of control direct current sources of opposite polarities therefor, a plurality of retarding networks each constituted by a condenser and a plurality of resistances connected at one of its terminals to the contacts of individual ones of said marking relays and at the other of its terminals to a terminal of the winding of a said control relay, the contacts of each said control relay being connected respectively to a respective said pair of control sources of opposite polarities, the midpoint of the winding of each said control relay being connected to the armature of the preceding said control relay, the mid-point of the first said control relay being connected to the armature of said separating relay, and the armature of the last said control relay being connected to the line on which the pre-corrected signals are to be transmitted.

5. In a system for the pre-correcting of trivalent signals which can have any one of three values to be transmitted on a line, a two conductor transmission line, a transmitter producing trivalent signals, an analyzing device connected to said transmitter and comprising two bivalent keys, two recording devices connected respectively to the output terminals of said two bivalent keys, a selecting device connected to the output of each said recording device to discriminate between the polarities of the successive bivalent signals recorded by said recording devices, a staggering device connected between each said separating device and each said selecting device, an adjustable retarding device connected to the output of said separating device, the adjustment of each said retarding device being controlled by the corresponding said selecting device in such manner that to each different combination of the polarities of the recorded signals there corresponds a determined value of delay, a principal source of direct current, two re-transmitting relays connected respectively to the output of the said two retarding devices and having their controlled contacts respectively connected in parallel, the armatures of said re-transmitting relays being connected respectively to the two conductors of said transmission line and their controlled contacts being connected in parallel to said principal source of direct current.

6. In a pre-correcting telegraph transmitter, a plurality of synchronously gang driven rotary distributors, a source of a bivalent telegraph signal, a line on which said signal is to be transmitted after pre-correction, each said rotary distributor having a plurality of contact sectors, and each having the same number, individual sources of auxiliary direct current potentials of opposite polarities, the brush of the first said distributor being connected to said bivalent source, a plurality of input relays having their actuating windings respectively connected to the contact sectors of said first distributor and their controlled contacts respectively connected to said auxiliary sources, the number of said input relays being equal to the number of sectors on each said distributor, an interconnection between one sector of each said distributor except said first distributor and the armature of a said input relay, each interconnection between the sectors of adjacent distributors being progressively geometrically staggered, a separating relay, a pair of sources of direct current potential of opposite polarities connected to the respective contacts of said separating relay, the actuating winding of said separating relay being connected to the brush of a final one of said distributors, a plurality of selecting relays, the actuating winding of each said selecting relay being connected between the brushes of adjacent intermediate ones of said rotary distributors intermediate said first and final distributor, the said intermediate distributor nearest said first distributor having one armature and two controlled contacts and the number of armatures on successive ones of said selecting intermediary relays increasing in binary geometrical progression, a plurality of retarding impedance elements respectively of different values of impedance each having one terminal respectively connected to the controlled contacts of the last one of said intermediary selecting relays nearest said last distributor and which has the largest number of armatures, connections between the controlled contacts of each said intermediary selecting relay and the armatures of the adjacent said selecting intermediary relay having the next larger number of armatures, an output transmitting relay having a center tapped actuating winding, connections between a first extreme terminal of the winding of said output transmitting relay and the free terminals of all of said retarding impedance elements, auxiliary impedance elements connected between the second terminal of the actuating winding of said output transmitting relay and the armature of said selecting intermediate relay having one armature, a pair of output sources of direct current voltage of opposite polarities respectively connected to controlled contacts of said output transmitting relay, the armature of said output transmitting relay being connected to said line, and a connection between the armature of said separating relay and the center tap of the actuating winding of said output transmitting relay, each of said input relays and its connections being respectively so connected to the sectors of said distributors that certain of said input relays correspond and respond to signals from said bivalent source subsequent to the given signal to be pre-corrected and others of said input relays correspond and respond to signals from said bivalent source preceding the given signal to be pre-corrected, and the connections of said relays, including said separating relay and said final distributor, and said retarding impedances being such that the action of said output transmitting relay is retarded with respect to the input signal from said bivalent source by at least the interval of one complete signal element of the code of signals as delivered by said bivalent source.

HONORÉ MARCEL BAYARD.
RAYMOND JACQUES CHARLES ROQUET.

No references cited.